US007447588B1

(12) United States Patent
Xu et al.

(10) Patent No.: US 7,447,588 B1
(45) Date of Patent: Nov. 4, 2008

(54) METHOD AND SYSTEM FOR PARTITIONING A CONTINENTAL ROADWAY NETWORK FOR AN INTELLIGENT VEHICLE HIGHWAY SYSTEM

(75) Inventors: Yiwen Xu, Brossard (CA); Xinyi Xu, Brossard (CA)

(73) Assignee: Wenshine Technology Ltd., Brossard (CA)

( * ) Notice: Subject to any disclaimer, the term of this patent is extended or adjusted under 35 U.S.C. 154(b) by 0 days.

(21) Appl. No.: 11/778,293

(22) Filed: Jul. 16, 2007

(51) Int. Cl.
*G08G 1/01* (2006.01)
*G08G 1/123* (2006.01)
*G06F 19/00* (2006.01)

(52) U.S. Cl. ....................... 701/117; 701/118; 701/119; 701/207; 701/213; 340/988; 340/995.1; 340/995.12; 340/995.13

(58) Field of Classification Search .............. 455/404.2, 455/422.1; 342/36, 37; 700/91; 701/117–119, 701/207, 213; 340/988, 995.1, 995.12–995.13
See application file for complete search history.

(56) References Cited

U.S. PATENT DOCUMENTS

| | | | | |
|---|---|---|---|---|
| 5,506,587 | A * | 4/1996 | Lans | 342/357.09 |
| 5,521,826 | A | 5/1996 | Matsumoto | |
| 5,812,069 | A * | 9/1998 | Albrecht et al. | 340/905 |
| 5,815,161 | A | 9/1998 | Emmerlink et al. | |
| 5,999,126 | A * | 12/1999 | Ito | 342/357.1 |
| 6,154,152 | A * | 11/2000 | Ito | 340/988 |
| 6,298,303 | B1 | 10/2001 | Khavakh et al. | |
| 6,333,703 | B1 | 12/2001 | Alewine et al. | |
| 6,385,531 | B2 | 5/2002 | Bates et al. | |
| 6,401,027 | B1 * | 6/2002 | Xu et al. | 701/117 |
| 6,480,783 | B1 | 11/2002 | Myr | |
| 6,567,743 | B1 | 5/2003 | Mueller et al. | |
| 6,574,553 | B1 * | 6/2003 | Beesley et al. | 701/209 |
| 6,609,063 | B1 | 8/2003 | Bender et al. | |

(Continued)

FOREIGN PATENT DOCUMENTS

CN 1779733 5/2006

(Continued)

OTHER PUBLICATIONS

Cova, Thomas J. and Goodchild, Michael F., "Spatially Distributed Navigable Databases for Intelligent Vehicle Highway Systems", GIS/LIS (1994) 191-200.

(Continued)

*Primary Examiner*—Thomas Black
*Assistant Examiner*—Jonathan M Dager
(74) *Attorney, Agent, or Firm*—Jean C. Edwards, Esq.; Akerman Senterfitt

(57) ABSTRACT

An intelligent vehicle highway system collects and provides real-time traffic data to a vehicle traveling on a continental roadway network. A digitized continental roadway network has nodes interconnected by links that define a digitized representation of the continental roadway network. To enable intelligent data collection and navigation over large expanses of the continental network, which would otherwise be computationally onerous, the digitized continental roadway network is partitioned into a plurality of digitized roadway subnetworks. The onboard vehicle navigation device has a processor for executing an application that instantiates a subset of the digitized roadway subnetworks in a vicinity of a current position of the vehicle to collect and provide relevant real-time traffic data to the vehicle in a computationally efficient manner.

7 Claims, 4 Drawing Sheets

U.S. PATENT DOCUMENTS

| | | | | |
|---|---|---|---|---|
| 6,611,749 | B1 | 8/2003 | Berwanger et al. | |
| 6,622,082 | B1 | 9/2003 | Schmidt et al. | |
| 6,636,802 | B1 * | 10/2003 | Nakano et al. | 701/208 |
| 6,647,251 | B1 | 11/2003 | Siegle et al. | |
| 6,650,948 | B1 * | 11/2003 | Atkinson et al. | 700/66 |
| 6,680,674 | B1 | 1/2004 | Park | |
| 6,735,515 | B2 | 5/2004 | Bechtolsheim et al. | |
| 6,754,580 | B1 | 6/2004 | Ask et al. | |
| 6,763,301 | B2 | 7/2004 | McDonough | |
| 6,850,840 | B1 | 2/2005 | Willenbrock et al. | |
| 6,879,907 | B2 | 4/2005 | Feldman et al. | |
| 7,142,979 | B1 | 11/2006 | Shonk | |
| 7,146,274 | B2 | 12/2006 | Linkohr | |
| 7,274,332 | B1 * | 9/2007 | Dupray | 342/450 |
| 2002/0075171 | A1 * | 6/2002 | Kuntman et al. | 340/961 |
| 2005/0107945 | A1 * | 5/2005 | Hiller et al. | 701/201 |
| 2005/0140524 | A1 * | 6/2005 | Kato et al. | 340/995.13 |
| 2005/0197763 | A1 * | 9/2005 | Robbins et al. | 701/200 |
| 2005/0228584 | A1 * | 10/2005 | Adachi et al. | 701/208 |
| 2006/0142933 | A1 * | 6/2006 | Feng | 701/117 |
| 2006/0161344 | A1 * | 7/2006 | Iwahori et al. | 701/211 |
| 2006/0276150 | A1 | 12/2006 | Ogasawara | |
| 2006/0282214 | A1 | 12/2006 | Wolterman | |
| 2007/0093960 | A1 * | 4/2007 | Atarashi | 701/211 |
| 2007/0208493 | A1 | 9/2007 | Downs et al. | |
| 2007/0208494 | A1 | 9/2007 | Chapman et al. | |
| 2007/0208495 | A1 | 9/2007 | Chapman et al. | |
| 2007/0208496 | A1 | 9/2007 | Downs et al. | |
| 2007/0225912 | A1 * | 9/2007 | Grush | 701/213 |
| 2007/0233359 | A1 | 10/2007 | Ferman et al. | |

FOREIGN PATENT DOCUMENTS

| | | | |
|---|---|---|---|
| EP | 1340962 | A2 | 9/2003 |
| WO | 03001432 | A1 | 1/2003 |
| WO | 2007/040900 | A2 | 4/2007 |

OTHER PUBLICATIONS

Kaufman, David E. and Smith, Robert L., "Fastest Paths In Time-Dependent Networks For Intelligent Vehicle-Highway Systems Application", Journal of Intelligent Transportation Systems, vol. 1, Issue 1 (1993) 1-11.

Gilmore, J.F.; Elibiary, K.J.; Forbes, H., "Intelligent control in traffic management" Vehicle Navigation and Information Systems Conference, 1994. IEEE Proceedings, Aug. 31-Sep. 2, 1994, pp. 491-496.

* cited by examiner

METHOD AND SYSTEM FOR PARTITIONING A CONTINENTAL ROADWAY NETWORK FOR AN INTELLIGENT VEHICLE HIGHWAY SYSTEM

CROSS-REFERENCE TO RELATED APPLICATIONS

This is the first application filed for the present invention.

TECHNICAL FIELD

The present invention relates, in general, to traffic engineering and, more particularly, to intelligent vehicle highway systems that collect traffic information and provide real-time traffic information to vehicles.

BACKGROUND ART

Real-time traffic data collection is of fundamental importance for traffic information management, road guidance, and intelligent vehicle highway systems (IVHS).

Most techniques addressing this issue use static probes, i.e. fixed sensors and/or cameras. Given the enormous size of a continental roadway system, and the sheer number of roads contained therein, it is impractical not to mention prohibitively expensive to install sensors and/or cameras throughout the network to collect road traffic data for each and every public road on the continent.

U.S. Pat. No. 6,401,027 (Xu et al.) entitled "Remote Road Traffic Data Collection and Intelligent Vehicle Highway System" discloses a method for collecting road traffic data by using moving vehicles as probes. As described in this patent, vehicles subscribing to the intelligent navigation service periodically transmit position data to a traffic data center which computes traffic conditions and broadcasts this traffic data back to the vehicles. In-vehicle navigation devices then display or otherwise use the traffic information to enable the vehicle occupants to intelligently navigate the roadways to seek the fastest route to their destination, primarily by avoiding traffic congestion. As taught by this above patent, each vehicle maintains only two digitized road network maps at any time, one being the continental expressway network map and the other being a local regional or metropolitan roadway network map. However, even though the foregoing technology can, in theory, cover the entire territory of a continent, the sheer number of links and nodes needed to represent all the roadways and intersections in a continental roadway system is so enormously large that it is computationally inefficient to do so.

Accordingly, there exists a need for a technology that would enable intelligent vehicle highway systems for the entire expanse of a continental roadway network to thereby provide computationally-efficient and seamless intelligent navigation services to vehicles traveling large distances from one portion of a continental roadway network to another.

SUMMARY OF THE INVENTION

In general, this invention relates to a continental roadway network partitioning technique for road traffic data collection and intelligent vehicle highway systems. In particular, a system and method is provided for dividing a continental roadway network into a set of smaller, computationally more manageable roadway networks for efficiently collecting real-time traffic data and providing traffic forecasts and travel guidance to drivers of vehicles equipped to interact with the system.

Accordingly, one aspect of the present invention entails a method of collecting real-time traffic data using vehicles and providing the real-time traffic data to an occupant of a vehicle traveling on a continental roadway network. This method includes steps of partitioning a digitized continental roadway network having a plurality of nodes and links that define a digitized representation of the continental roadway network into a plurality of digitized roadway subnetworks, and instantiating one or more traffic managers in an onboard vehicle navigation device for each one of a subset of digitized roadway subnetworks that lie in a vicinity of a current position of the vehicle to collect and provide relevant real-time traffic data from and to the vehicle.

Another aspect of the present invention entails an intelligent vehicle highway system for collecting and providing real-time traffic data from and to vehicles traveling on roadways that are part of a continental roadway network. The system includes a plurality of vehicles each having an onboard vehicle navigation device having a global positioning system (GPS) receiver for generating real-time position data for the vehicle, a wireless transceiver for transmitting the real-time position data and for receiving traffic data, the onboard vehicle navigation device having a processor that executes an application for instantiating one or more traffic managers for each of the digitized roadway subnetworks defined by partitioning a digitized continental roadway network representative of the roadways of a continent to form a partitioned continental roadway network. The system also includes a traffic data center having a wireless transceiver for receiving real-time position data from the plurality of vehicles in the network and for transmitting to the vehicles processed traffic data based on the real-time position data received from the plurality of vehicles in the network.

Yet a further aspect of the present invention entails an onboard vehicle navigation device for collecting, transmitting and receiving real-time traffic data and for providing intelligent navigation to an occupant of a vehicle traveling on a continental roadway network. The onboard (in-vehicle) device includes a global positioning system (GPS) receiver for generating a current position of the vehicle, a wireless transceiver for transmitting the current position of the vehicle to a traffic data center for processing traffic data to be communicated back to the wireless transceiver, a processor that executes an application for instantiating a plurality of partitioned subnetworks relevant to the current position of the vehicle, the partitioned subnetworks being defined by partitioning a digitized continental roadway network that represents the continental roadway network in terms of nodes interconnected by links to thus form a partitioned continental roadway network, and a user interface for presenting the traffic data to the occupant of the vehicle to enable intelligent navigation through the roadway network.

This new technology facilitates what would otherwise be a computationally onerous, if not impossible, task given the limitations of current microprocessors, namely providing real-time traffic data to vehicle occupants for large expanses of a continental roadway network. Despite the limited computational processing power of onboard vehicle navigation devices, intelligent navigation can be provided by innovatively partitioning a continental roadway into more computationally manageable subnetworks. Even if processor speeds were to be dramatically improved, this new technology would still be extremely useful in radically augmenting computational efficiency. Traffic managers for relevant subnetworks are instantiated to provide traffic intelligence about the immediate vicinity without wasting computational resources on areas or regions that are far away. Accordingly, this technology collects traffic data and provides intelligent navigation to vehicles even if they travel long distances, e.g. from one metropolitan area to another, and is thus highly useful for long-distance commuters, people on road trips, long-distance truckers, to name but a few end-users. Nevertheless, the traffic data that is collected from all participating vehicles in the network is shared among all other subscribers, whether they are traveling long distances or merely locally (short distances).

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
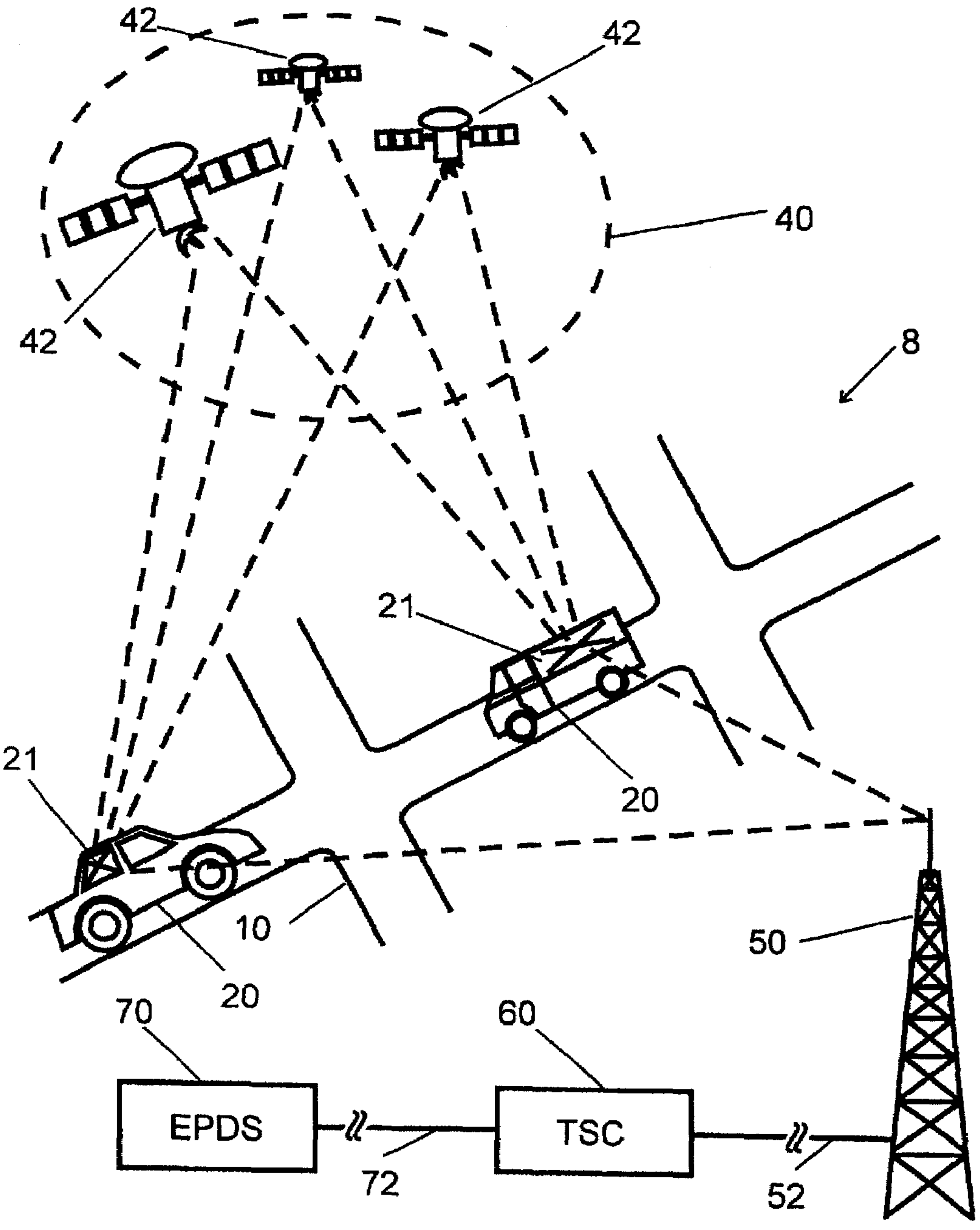
FIG. 1 is a schematic layout of key components of an intelligent vehicle highway system in which the present technology can be implemented.

By way of general introduction, and as will be elaborated below, an intelligent vehicle highway system collects real-time traffic data and provides processed real-time traffic data to an occupant (e.g. driver) of a vehicle traveling on a continental roadway network or other large-scale roadway network. A digitized continental roadway network represents the continental roadway network using nodes (for intersections or highway exits or entrances) that are interconnected by links (for each direction of each roadway) to thus define a digitized representation of the continental roadway network. To enable intelligent navigation over large expanses of the continental network, which would otherwise be computationally inefficient if the entire continental network had to be loaded, the digitized continental roadway network is partitioned into a plurality of digitized roadway subnetworks. The onboard vehicle navigation device has a processor for executing a software application that instantiates a subset of the digitized roadway subnetworks in a vicinity of a current position of the vehicle to collect real-time traffic data and to provide relevant, processed real-time traffic data to the occupant of the vehicle in a computationally efficient manner.

Method Overview

Again by way of introduction, and as will be elaborated below in greater detail with reference to FIGS. 1-4, a method of collecting real-time traffic data and providing processed real-time traffic data to an occupant of a vehicle traveling on a continental roadway network includes an initial step of partitioning a digitized continental roadway network having a plurality of nodes and links that define a digitized representation of the continental roadway network into a plurality of digitized roadway subnetworks. The step of partitioning the digitized continental roadway network is preferably done once (with optional subsequent updates to account for road closures and new roads) and then stored on a server or other storage means for uploading preferably by wireless link to the VSS onboard each vehicle. Alternatively, the subnetworks of the partitioned network can be uploaded from a CD-ROM, DVD or other computer-readable storage medium. Subsequent to loading of the partitioned network, updates can be transmitted wirelessly as over-the-air patches to update the digitized continental roadway network to account for road closures, new roads that are built or expanded, or for new exits or entrances, etc. CD-ROM, DVD or computer-readable medium updates could also be distributed at gas stations or through the American Automobile Association (AAA) or the Canadian Automobile Association (CAA), convenience stores, etc.

Partitioning of the continental network results in a plurality of subnetworks, each representing a region of the continent, such as a metropolitan area, or a expanse of territory, etc. The partitioning is done by dividing the continental roadway network into regions represented by respective subnetworks of nodes interconnected by links, the regions being demarcated by enclosed demarcation lines (i.e. virtual boundaries between subnetworks) which are drawn to represent each region's limit such that no line segment of any demarcation line coincides with a link of any of the subnetworks. In other words, the demarcation lines are drawn such that demarcation lines intersect roadways but do not overlie any roadways. Each demarcation line includes a plurality of artificially defined demarcation nodes with which are associated an ID of an immediately adjacent subnetwork. Thus, artificial nodes can be added to define virtual boundaries or limits to delimit the distinct regions of the partitioned network.

Once the partitioning is done, the next step in the method is instantiating one or more traffic managers (also known herein as "digitized roadway network managers") in an onboard vehicle navigation device for each one of a subset of digitized roadway subnetworks that lie in a vicinity of a current position of the vehicle to collect real-time traffic data and to provide relevant, processed real-time traffic data to the occupant of the vehicle. A software application executing on a processor in the onboard vehicle navigation device should instantiate no more than four traffic managers while executing a control process to control each of the traffic managers.

As will be elaborated below, the partitioned continental roadway network has a joint awareness zone (JAZ) defining an inner buffer immediately on each side of each demarcation line that partitions one subnetwork from a neighboring subnetwork, the joint awareness zone having a plurality of awareness nodes forming an awareness line approximately parallel to the respective demarcation line whereby vehicle position data for a vehicle located within the joint awareness zone is shared between the traffic managers associated with the neighboring subnetworks on either side of the demarcation line. The girth of the joint awareness zone (JAZ) is determined by the Level of Awareness (LOA) which is a tunable parameter that can be varied to alter the performance of the system. The LOA will be discussed in greater detail below. The partitioned network also has an instantiating/terminating threshold (ITT) as an outer buffer immediately on each side of the joint awareness zone, the instantiating/terminating threshold having a plurality of lifeline nodes arranged approximately parallel to both the awareness line and the demarcation line whereby arrival of the vehicle at one of the lifeline nodes causes instantiation of a new traffic manager or termination of an existing traffic manager. Operation and further implementation details for this novel method will be presented below with reference to the accompanying drawings.

System Overview

FIG. 1 illustrates a traffic data remote collection and intelligent vehicle roadway system (also referred to herein as an intelligent vehicle highway system (IVHS) or an "intelligent vehicle navigation system") which is generally designated by reference numeral 8. A group of vehicles 20 travel a roadway system 10, which may be a metropolitan highway system, a regional highway system, a national expressway system, a cross-continent expressway system, rural roads, state highways, etc, or the streets, roads, avenues and boulevards of a city, town or municipality, etc. Each vehicle 20 is equipped with an in-vehicle device 21 (also referred to herein as an "onboard vehicle navigation device") which receives global positioning data from satellites 42 of a Global Positioning System (GPS) 40 or equivalent system. The onboard vehicle navigation device 21 converts the GPS information into respective instantaneous positions of the respective vehicle relative to a digitized road network map that represents the roadway system on which the vehicle is traveling. The digitized road network map includes a reference system (latitude and longitude) consistent with the reference system used by the GPS 40. The in-vehicle device 21 intermittently transmits the instantaneous roadway positions of the vehicle as radio frequency (RF) data to a communication station 50. The communication station 50, in turn, transfers the instantaneous vehicle positions through a transfer medium 52 (i.e. a communication link which could be a wired link such as a fiber optic cable or a copper wire or a wireless link) to a traffic service center 60 (hereinafter referred to simply as a "traffic data center"). The traffic data center 60 is also connected to External Party Data Sources (EPDS) 70 which may include information departments of law enforcement agencies, 911 service centers and government agencies such as weather departments, highway and traffic administration departments, etc. The traffic data center 60 uses the instantaneous road positions of all vehicles 20 and the information obtained from the external party data sources (EPDS) to provide real-time road traffic conditions for the roadway system 10 and broadcasts the traffic conditions via the communication station 50. The in-vehicle device 21 on each vehicle 20 receives the traffic conditions from traffic data center 60 and processes information included in the traffic condition broadcasts to provide route planning (intelligent navigation) to the driver by recommending real-time optimum travel routes based on real-time or forecast traffic conditions. Further implementation details regarding this system are described in U.S. Pat. No. 6,401,027 (Xu et al.) entitled "Remote Road Traffic Data Collection and Intelligent Vehicle Highway System", which is hereby incorporated by reference in its entirety.

This system is improved by providing an enhanced software component for executing on the processor of the onboard vehicle navigation device 21 that uses subnetworks of a partitioned digitized continental roadway network to alleviate the computational burden on the processor while still collecting traffic data and providing intelligent navigation for the immediate vicinity of the vehicle. In other words, an intelligent vehicle navigation system in accordance with an embodiment of the present invention collects and provides real-time traffic data from and to vehicles traveling on roadways that are part of a continental roadway network. This improved system includes a plurality of vehicles each having an onboard vehicle navigation device having a global positioning system (GPS) receiver for generating real-time position data for the vehicle, a wireless transceiver for transmitting the real-time position data and for receiving traffic data, the onboard vehicle navigation device having a processor that executes an application for instantiating one or more traffic managers for each of the digitized roadway subnetworks defined by partitioning a digitized continental roadway network representative of the roadways of a continent to form a partitioned continental roadway network. This improved system also includes a traffic data center having a wireless transceiver for receiving real-time position data from the plurality of vehicles in the network and for transmitting to the vehicles processed traffic data based on the real-time position data received from the plurality of vehicles in the network.

Onboard Vehicle Navigation Device

Figure 2:
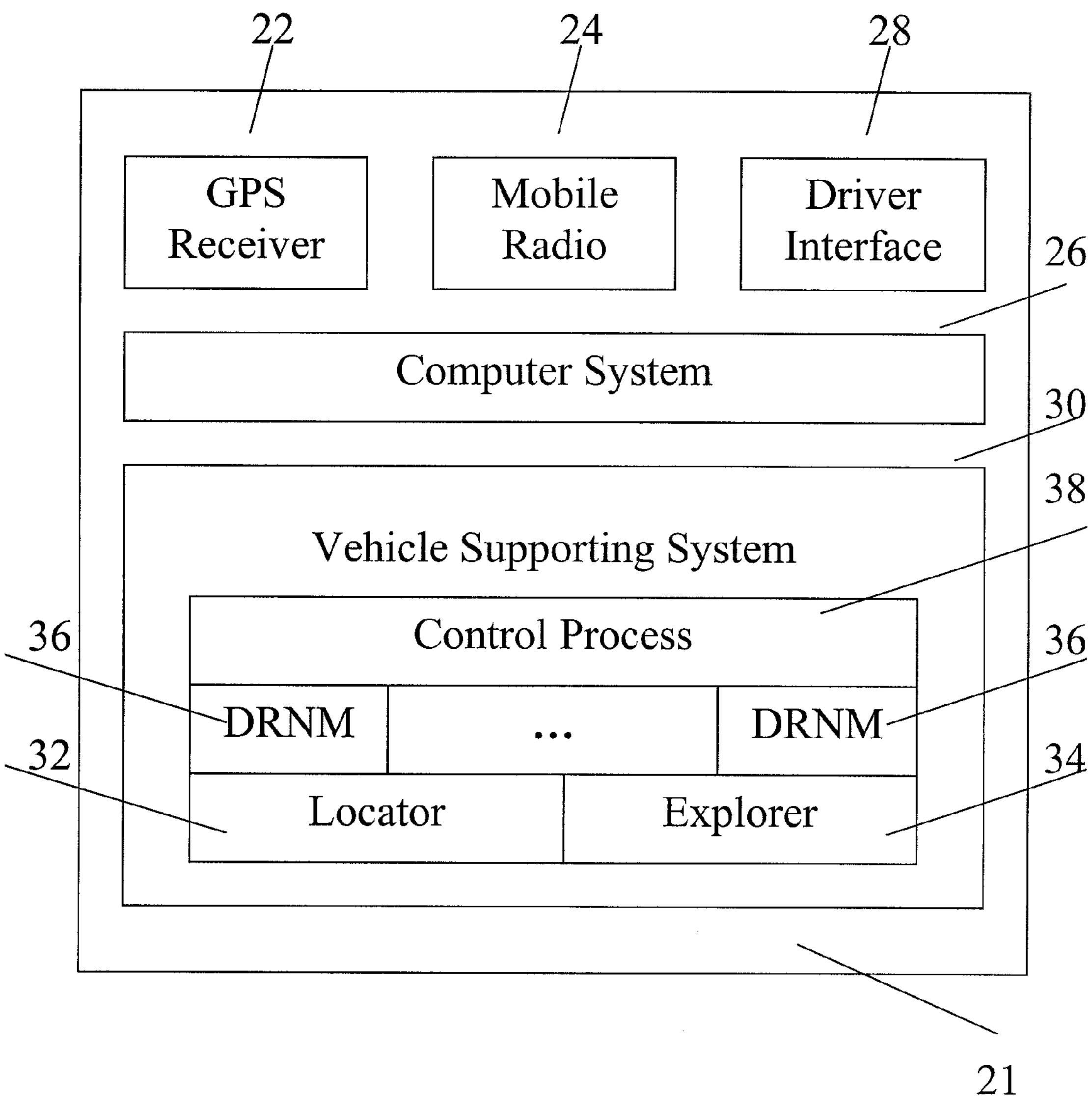
FIG. 2 is a block diagram of key components of an onboard vehicle navigation device ("in-vehicle device") in which the present invention can be implemented.

As depicted in FIG. 2, an enhanced vehicle support subsystem (VSS) 30 is provided in the onboard vehicle navigation device (in-vehicle device) 21. The enhanced VSS 30 includes a road network locator 32 (hereinafter simply locator 32) and a road explorer 34. A mobile radio subsystem 24 (i.e. a wireless RF transceiver) is provided for exchanging radio frequency data with the traffic data center 60 via the communication station 50. Also included in the onboard vehicle navigation device (in-vehicle device) 21 are a computer system 26 for operating the subsystems and storing the digitized road network map. A driver/user interface 28 includes a microphone, data entry pad, screen display and loudspeaker to permit drivers (or other vehicle occupants, such as a passenger who is navigating for the driver) to interact with the onboard vehicle navigation device (in-vehicle device) 21.

The locator 32 computes the geographical location of the vehicle, using data received from the GPS receiver 22, and converts it to a position on the digitized road network map and stored in the computer system 26. From time to time, the mobile radio subsystem 24 transmits vehicle position data processed by the locator 32 to the communication station 50 which forwards road traffic data reported from all vehicles 20 traveling the roadway system 10 to the traffic data center 60 for further processing. The processed data is used for forecasting road traffic conditions. The mobile radio system 24 in the vehicle 20 also receives data broadcast by the communication station 50. In addition to traffic forecasts, the broadcast data may include one or more digitized road network maps (that is, if such maps have not yet been uploaded by CD, DVD, or other computer-readable storage means). The data received by the mobile radio subsystem 24 is stored by the computer system 26 and the road network explorer 34 uses the data in conjunction with driver's instructions received from the driver interface 28 to provide intelligent route guidance or "intelligent navigation". The intelligent route guidance (intelligent navigation), such as an optimum travel route based on real-time traffic conditions, can be displayed on the screen display of the driver interface 28 (or, generically, the "user interface" when the device is used by a vehicle occupant other than the driver). Further implementation details regarding this device are described in U.S. Pat. No. 6,401,027.

The device presented in U.S. Pat. No. 6,401,027 is improved by providing an enhanced software component for executing on the processor of the onboard vehicle navigation device 21 that uses subnetworks of a partitioned digitized continental roadway network to alleviate the computational burden on the processor while still providing intelligent navigation for the immediate vicinity of the vehicle. In other words, an intelligent vehicle navigation device in accordance with another embodiment of the present invention provides intelligent navigation to an occupant of a vehicle traveling on a continental roadway network. This improved device has a global positioning system (GPS) receiver for generating a current position of the vehicle, a wireless transceiver for transmitting the current position of the vehicle to a traffic data center for generating traffic data to be communicated back to the wireless transceiver, a processor that executes an application for instantiating a plurality of partitioned subnetworks relevant to the current position of the vehicle, the partitioned subnetworks being defined by partitioning a digitized continental roadway network that represents the continental roadway network in terms of nodes interconnected by links to thus form a partitioned continental roadway network, and a user interface for presenting the traffic data to the occupant of the vehicle to enable intelligent navigation through the roadway network.

Attributes of a Digitized Continental Roadway Network

A continental roadway network can be understood as a roadway system or network that includes all of the publicly accessible roadways of a given continent, and thus include the network of expressways, highways, rural roads, streets, avenues, roads and boulevards upon which a vehicle may travel. As will be appreciated, the continental roadway network need not strictly speaking be "continental" in scope. In other words, the roadway network could also be a national roadway network and therefore the present technology can be applied equally to a national roadway network that would include all of the public roadways of a particular country. Indeed, persons of ordinary skill in the art will appreciate that the present technology can be applied to any roadway network that is too large to be computationally efficient on a microprocessor of an onboard vehicle navigation device. Accordingly, the expression "continental" should be construed as referring to a large-scale roadway system or road network that is computationally inefficient for the microprocessor of the onboard vehicle navigation device and is thus not limited to roadway networks that are continental in their reach. For example, this technology could be used for the roadway network of Japan (a national roadway) or of the USA alone (also national in scope). Nevertheless, the main purpose of this technology is to enable collection of traffic data and intelligent navigation over roadway networks that are continental in scope, such as, for example, the roadway network of North America, the roadway network of Europe, or the roadway network of Australia.

The continental roadway network is digitized by representing every roadway by one or more links. A link is a directional/oriented road segment connecting two nodes, which can be thought of as a source node and a sink node, i.e. a link connects its source to its sink. A bidirectional (two-way) road would be represented by two oppositely oriented links representing each direction of travel on the bidirectional road. A one-way road would, of course, be represented by only a single link. Nodes are used to represent intersections, highway exits (off-ramps) or highway entrances (on-ramps). As will be elaborated below, artificial nodes can be artificially defined along links to facilitate partitioning and to define buffer zones for information management and instantiation/termination of traffic managers. A route is thus a set of sequential links such that the first link's sink is the second link's source, and so on. The length (or "scale") of a route, from a starting node to a destination node, is thus equal to the number of links. The distance from one node N1 to another node N2 is thus defined as the scale of a shortest route from N1 to N2. The distance from a node to the demarcation line is the scale of a shortest route from the node to any node on the demarcation line. The distance from a link to the demarcation is defined as the distance from the sink of the link to the demarcation+1. Accordingly, a link's DTD will never be zero and a node's DTD is non-negative. Distance can also be expressed in meters, kilometers, miles, or other units of linear measure or in terms of a number of links. Distance can thus be represented using scale or distance, or alternatively a combination or weighted combination of both. Using nodes and links in the manner described in U.S. Pat. No. 6,401,027 enables one to digitize ("discretize") the continental roadway network into a digitized continental roadway network that is a digitized representation of the continental roadway network.

Each node in the network has associated data that includes a node index, latitude, longitude, DTD and may include other data relevant to the IVHS (Intelligent Vehicle Highway System). Similarly, each link has associated data that includes a link index, source, sink, length, and may include other data relevant to the IVHS. Each subnetwork manager has a unique subnetwork identifier. For example, subnetwork index 0 could be assigned to the backbone expressway network, subnetwork indices 1 to 10,000 could be assigned to metropolitan subnetworks and networks indices 10,001 and higher could be assigned to other subnetworks in the digitized continental roadway network. Each subnetwork's traffic manager responsible for each subnetwork also has an indication of the identification of each of its neighboring regions/subnetworks and also contains the total number of nodes and total number of links in the subnetwork. Each subnetwork's traffic manager also has knowledge of the identity of each of the neighboring JAZ nodes and links.

Partitioning the Digitized Continental Roadway Network

The continent (or other large territory) is partitioned into discrete and distinct regions (e.g. states, provinces, counties, metropolitan areas, or arbitrarily defined regions) by partitioning the digitized continental roadway network into subnetworks corresponding to each region using demarcation lines such that no linear segment of any demarcation line overlies or coincides with any link. In other words, the subnetworks are defined by "cleanly" partitioning the network so that the demarcation lines intersect links but do not coincide with any links. The resulting partitioned continental roadway network is composed of a plurality of subnetworks, each being represented by nodes interconnected by links. Along each demarcation line are artificially defined demarcation nodes that are added to facilitate the handling of transitions from one subnetwork to another, as will be explained below. By analogy with the techniques exposed in U.S. Pat. No. 6,401,027, vehicle location reports and traffic data received back from the traffic data center is provided in terms of nodes and links for one or more of the subnetworks, thus enabling route guidance calculations and intelligent navigation through the one or more relevant subnetworks. For the purposes of nomenclature, a "backbone network" means a continental expressway network or continental highway network (e.g. the network of U.S. Interstate highways). "Capillary networks" include all other roadway networks in the continental roadway system, including, for example, state or provincial roadway networks, regional or rural roadway networks, and metropolitan roadway networks. As will be appreciated, when a vehicle is traveling along a roadway of the continental roadway network, it is not necessary to have traffic information about far-off locations that do not impinge on the traffic conditions or route selection in the immediate vicinity of the vehicle. Therefore, as will be explained below, only the traffic conditions in certain proximate ("relevant")

subnetworks of the partitioned network need to be determined or obtained. This is the great advantage of partitioning the continental roadway network into smaller, more manageable subnetworks. It is important to note that the partitioning of the continent into regions need not concord with predetermined geographical entities such as cities, counties, or states. In other words, demarcation lines are not necessarily drawn along city boundaries, state lines, county lines, etc. The continental area can be partitioned arbitrarily such that a given region encompasses, for example, a portion of one county of one state and a portion of a different county of another state. Arbitrary partitioning of the continental network (without aligning demarcations with actual geographical boundaries) ensures that regions are optimally drawn to facilitate the smooth handover from one traffic manager (digitized roadway network manager) to another. Partitioning of the network is preferably done only once by a human operator or using special software in order to provide an optimal partitioning of the network, although partitioning could also be performed by the enhanced VSS 30 in the onboard device 12 in each vehicle. Once the network has been partitioned into subnetworks of links and nodes, this "static" roadway data (the digitized roadway network data) is uploaded to the enhanced VSS 30 in each vehicle, e.g. by CD, DVD or wireless link. Wirelessly uploading this digitized roadway network data is preferable since this technique provides potentially "fresher", updated data on the network, taking into account road closures or new roads that have been opened. Alternatively, new versions, containing changes to the road network, can be provided to users on CD, DVD or on another type of computer-readable storage medium.

In operation, digitized roadway network data representing the links and nodes of relevant subnetworks is preferably loaded to the VSS 30 after being received over-the-air by the wireless RF transceiver in the onboard vehicle navigation device 21 from the traffic data center 60. As mentioned above, the preferred technique is to partition the network first, store the resulting subnetworks, and then upload relevant subnetworks wirelessly, which thereby avoids the inefficiencies of having to load the digitized roadway network data for the entire continental roadway system into the VSS 30. In this present invention, as introduced above, a continental roadway network is partitioned into smaller subnetworks, including a backbone network representing a continental expressway network and a plurality of capillary roadway subnetworks. For each subnetwork, a Digitized Roadway sub-Network (DRN) Manager (DRNM) 36 is employed to collect, manage and process traffic data for a respective subnetwork of roadways to plot optimal routes through the links and nodes of the subnetwork to avoid areas of congestion. Each DRNM is implemented as a computer process in the VSS 30. For the purpose of this specification, a DRNM shall also be known as a "traffic manager" since it collects and then manages/processes traffic data received from the traffic data center for a respective subnetwork. In other words, as will be explained below, a traffic manager (or DRNM) is instantiated as a separate computer process to handle traffic data for each respective subnetwork of the partitioned continental roadway network. In comparison with the prior-art system described in U.S. Pat. No. 6,401,027, this improved technology uses an enhanced VSS that includes a Control Process (CP) and multiple traffic managers (i.e. multiple DRNMs) to handle relevant subnetworks of the partitioned network.

Partitioning of the continental roadway network can be done in such a manner that, at any location, a vehicle concerns at most four (4) subnetworks: the continental expressway subnetwork (i.e. the backbone network); a regional capillary subnetwork; and two neighboring capillary subnetworks. In other words, the vehicle might be on either the continental expressway subnetwork or a regional capillary subnetwork, with two (2) other capillary subnetworks serving as neighboring subnetworks. As will be readily appreciated in view of this disclosure, more than four (or fewer than four) subnetworks can be instantiated in other variants of this technology. For example, in a variant, it might be useful to instantiate five or six traffic managers for five or six respective subnetworks in a case where the partitioning of the continental territory into regions has a smaller granularity (i.e. smaller regions are created by partitioning).

Preferably, and subject to the potential variation described in the foregoing paragraph, at most four (4) DRN managers are employed in the enhanced VSS 30. Most of the time, however, the enhanced VSS 30 only uses two (2) DRN managers (traffic managers): one representing the continental expressway subnetwork, and the other representing a local capillary subnetwork on which the vehicle is currently located. When the vehicle is approaching a neighboring capillary network, and has approached beyond a predetermined threshold, a DRN manager needs to be instantiated to represent the subnetwork that the vehicle is approaching. If the vehicle is simultaneously approaching two (2) capillary networks, i.e. nearing the junction of three regions, then two (2) DRN managers are instantiated to represent, respectively, the two adjoined neighboring capillary networks. Instantiating two DRN managers for the two capillary networks that the vehicle is approaching is necessary to ensure that regardless which of the two roadway subnetworks the vehicle enters, a DRN manager corresponding to the entered subnetwork will be running.

Although there always is more than one active DRN manager in the enhanced VSS 30, only one DRN manager (i.e. the one corresponding to the roadway network on which the vehicle is currently driving) plays a primary role: getting the position of the car, through Locator 32, and reporting the car's location data to the traffic data center 60. Each DRN manager receives and updates real-time traffic data of its subnetwork and is effectively on standby, i.e. ready to take over responsibilities as primary DRN manager if the vehicle moves into its own subnetwork.

When a vehicle moves into a new subnetwork, a new traffic manager (DRNM) is activated as the primary traffic manager (primary DRNM). The traffic manager for the subnetwork from which the vehicle has just departed is downgraded from "primary" to "standby", i.e. its process remains instantiated and a decision must also be made as to whether that existing traffic manager that remains instantiated is still relevant or whether it should be deactivated or terminated. Once the vehicle has gone beyond a predetermined threshold outbound from the previous subnetwork, i.e. has left a buffer zone or belt on the other side of the demarcation line, the VSS no longer needs the DRN manager (traffic manager) that handles the previous subnetwork. Thus, the DRN manager will be terminated as being no longer required.

JAZ, ITT and Other Implementation Details

An outer buffer zone or outer belt, representing a first threshold, is defined as an Instantiating/Terminating Threshold (ITT). An inner buffer zone, or inner belt, representing a second threshold, is defined as a Joint Awareness Zone (JAZ). There is thus an inner buffer zone within an outer buffer zone (or effectively two layers or belts on each side of the demarcation line between adjacent regions or subnetworks). In general, when a vehicle hits the outer buffer known as the ITT, a traffic manager is instantiated for the subnetwork being approached. When the vehicle approaches even closer to the demarcation line dividing one subnetwork from its neighboring subnetwork, the vehicle hits the awareness line of the Joint Awareness Zone (JAZ). The active/primary traffic manager for the subnetwork in which the vehicle is presently traveling then begins to share vehicle position data with the traffic manager of the neighboring subnetwork to thereby make both traffic managers for the neighboring subnetworks aware of the vehicle position. Because of the proximity of the vehicle to the neighboring subnetwork (and hence the likelihood that the vehicle may in fact traverse into the neighboring subnetwork), the traffic manager for the neighboring subnetwork may not only receive traffic data, but may also determine congested areas and provisionally compute optimal routes for the vehicle in the event that the vehicle actually traverses the demarcation line.

The Joint Awareness Zone (JAZ) runs substantially parallel to the demarcation line, thus defining an inner belt or buffer zone. The JAZ has a plurality of awareness nodes (some of which may be artificially defined) arranged roughly parallel to the demarcation line in what is referred to herein as an "awareness line", thus constituting a predetermined threshold for triggering the exchange of vehicle position information with the traffic manager of an adjacent subnetwork.

Immediately outside the JAZ is the ITT (Instantiating/Terminating Threshold) which is an outer belt or buffer running also parallel to the awareness line and demarcation line. The ITT is also known as a "lifeline" and includes a plurality of lifeline nodes, some of which may be artificially defined. In other words, a node is a "lifeline node" (in regards to its neighboring network) if its Distance to Demarcation (DTD) or Distance from Demarcation (DFD) is equal to the ITT. A line passing through all lifeline nodes within a region (subnetwork), as mentioned above, is called the "lifeline". The "lifeline" is so called because it either brings to life (instantiates) a traffic manager (computer process) or it terminates/kills a traffic manager (computer process). If a vehicle is driving toward a neighboring subnetwork, then the neighboring subnetwork's manager needs to be instantiated when the vehicle hits the lifeline. If the vehicle is driving away from a neighboring subnetwork, then the neighboring subnetwork's manager will be terminated when the vehicle hits the lifeline (having, of course, traverse to the other side of the demarcation line). From the foregoing, it should be apparent that each region is enclosed by one or more demarcation lines concentrically within which are the lifelines (ITT) and awareness lines that form the outer and inner buffers, respectively, around the periphery or boundary of each region. The lifelines and awareness lines are each closed lines, each tracking approximately parallel to the boundary (demarcation lines) of their respective region.

The width of the ITT (i.e. the distance from the demarcation to the ITT's lifeline) is chosen based on the real-time traffic data broadcast cycle. One criterion is that the DRN manager (traffic manager) should be instantiated such that it is given enough time to receive a full traffic data broadcast before the vehicle moves into its territory.

In an alternative embodiment, instead of instantiating/terminating DRN managers, it is possible to merely awaken/hibernate the various processes. In this implementation, four (4) DRN managers (traffic managers) are created when the system boots up. No DRN managers are terminated at any time. Instead, a DRN manager is merely hibernated when it is no longer required, and it will be awakened only when the control process considers it necessary or expeditious to do so.)

The enhanced VSS 30 uses a Control Process 38, as depicted schematically in FIG. 2, to instantiate and terminate a DRN manager (i.e. traffic manager) and to coordinate operations among the various DRN managers (traffic managers), including for example the hand-over of primary vehicle tracking responsibility when the vehicle crosses over from one subnetwork to an adjacent subnetwork.

Figure 3:
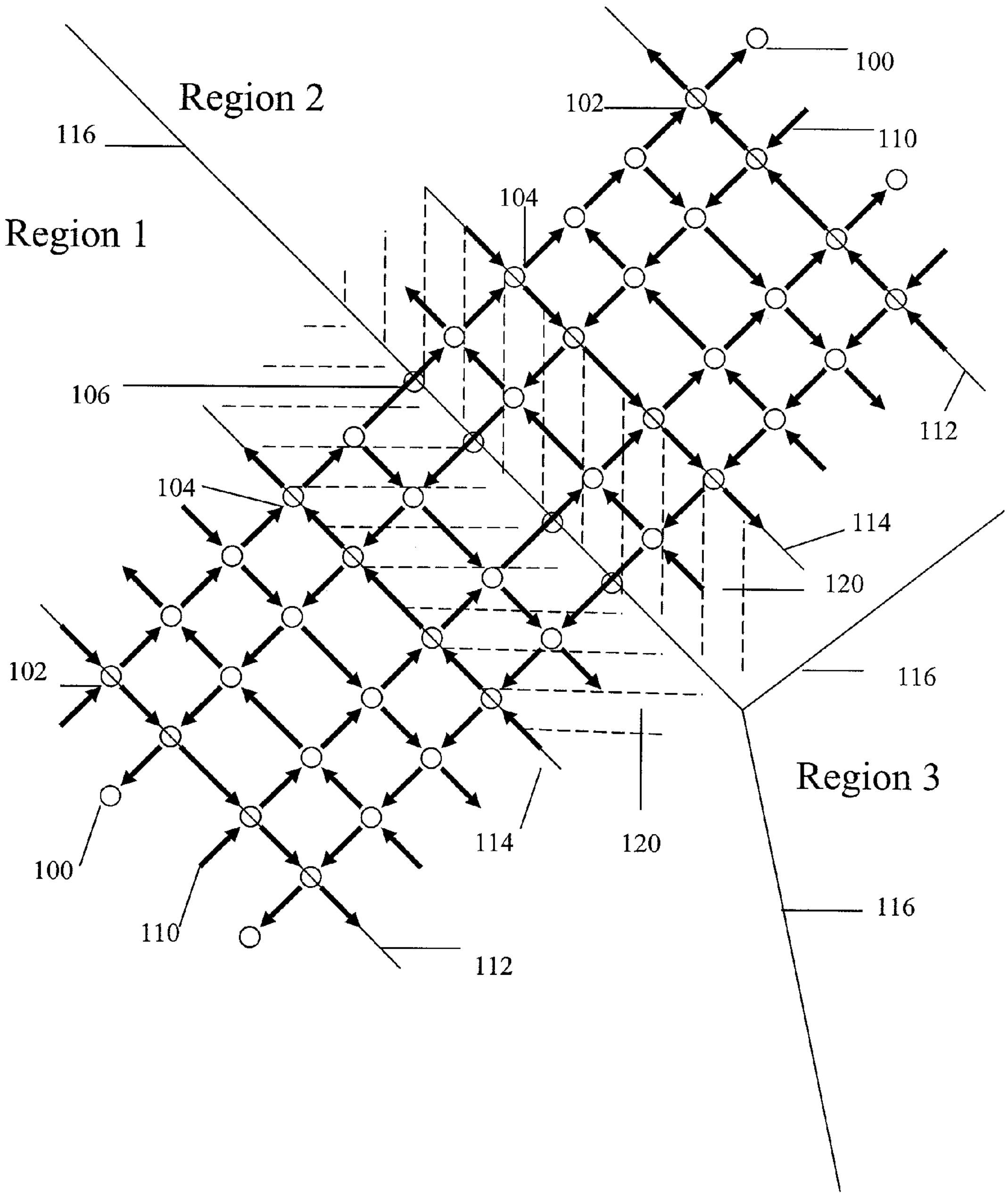
FIG. 3 is a schematic depiction of a method of partitioning a continental roadway network in accordance with an embodiment of the present invention.

FIG. 3 depicts a part of a roadway network where a threshold number (of the ITT)=5, and the Level of Awareness (LOA)=2. These values are provided solely by way of example to illustrate the operation of the present technology. The LOA ("Level of Awareness") is a tunable parameter that can be varied to change the performance of the navigation system. The LOA determines the placement of the awareness line and hence the width of the joint awareness zone (JAZ). In particular, a common LOA value is selected for all capillary subnetworks and an LOA of zero (0) is set for the backbone subnetwork. Setting the LOA to 0 for the backbone subnetwork does not mean that vehicle positions when driving on the backbone will not be shared with the traffic manager of the local capillary subnetwork. On the contrary, vehicle positions when driving on the backbone will always be shared with the traffic manager of the local capillary subnetwork. Actually, the projection of the backbone to the local capillary subnetwork is part of the local capillary subnetwork. Therefore, when driving on the backbone network, the vehicle is present on two (2) subnetworks: the backbone and the local capillary subnetwork.

A higher LOA is more computationally onerous since information is shared more frequently. A higher LOA, in theory, provides more intelligent navigation since the occupant of the vehicle is made aware of traffic conditions that are far from the present location of the vehicle, thus providing better chances of avoiding congested areas. Conversely, a lower LOA is computationally easier but provides less "intelligence" about traffic conditions prevailing in regions beyond the immediate vicinity of the vehicle. In other words, when the Distance to Demarcation (DTD) is greater than the LOA, the vehicle is outside the joint awareness zone (JAZ), and it is probably not relevant to make the manager for the adjoining region aware of the vehicle's current location. However, when the DTD is less than or equal to the LOA, then the vehicle is either at an awareness node or within the JAZ, in which case the manager of the adjoining region needs to know where the vehicle is currently located. In practice, however, if the continental network is properly partitioned such that demarcation lines are only drawn in rural areas or areas of lower population density, then the use of a low LOA is preferable. In other words, if metropolitan roadway networks are never partitioned into two (2) adjoining metropolitan subnetworks, then congestion areas will rarely, if ever, arise in close proximity to a demarcation line. If this sort of partitioning can be achieved, a low LOA becomes advantageous to economize computational resources while nevertheless ensuring a smooth handover from one traffic manager (DRNM) to another.

The area illustrated in FIG. 3 covers three (3) regions whose respective subnetworks are separated by the demarcation lines 116. Again, it is to be understood that this diagram is presented merely by way of example to illustrate embodiments of the invention, and nothing in the details of this diagram should be taken as limiting the scope of the invention defined in the appended claims. For example, the respective sizes/widths of the JAZ 120 and ITT 112 can be varied beyond what is illustrated in this example.

The partitioned network includes nodes 100 and links 110. Nodes with DTD=5 or DFD=5 are the lifeline nodes 102 along the ITT 112. Nodes with DTD=2 or DFD=2 are the awareness nodes 104 along the awareness line 114. Nodes with DTD=0 are demarcation nodes 106 along the demarcation line 116. The lifeline 112 passes all lifeline nodes 102 of a region and is substantially parallel to the region's demarcation line. The awareness line 114 passes through all awareness nodes 104 of a region and is substantially parallel to the region's demarcation line as well. The shaded area bounded by the awareness line 114 and the demarcation line 116 in each region is the Joint Awareness Zone (JAZ) 120 for that region.

Figure 4:
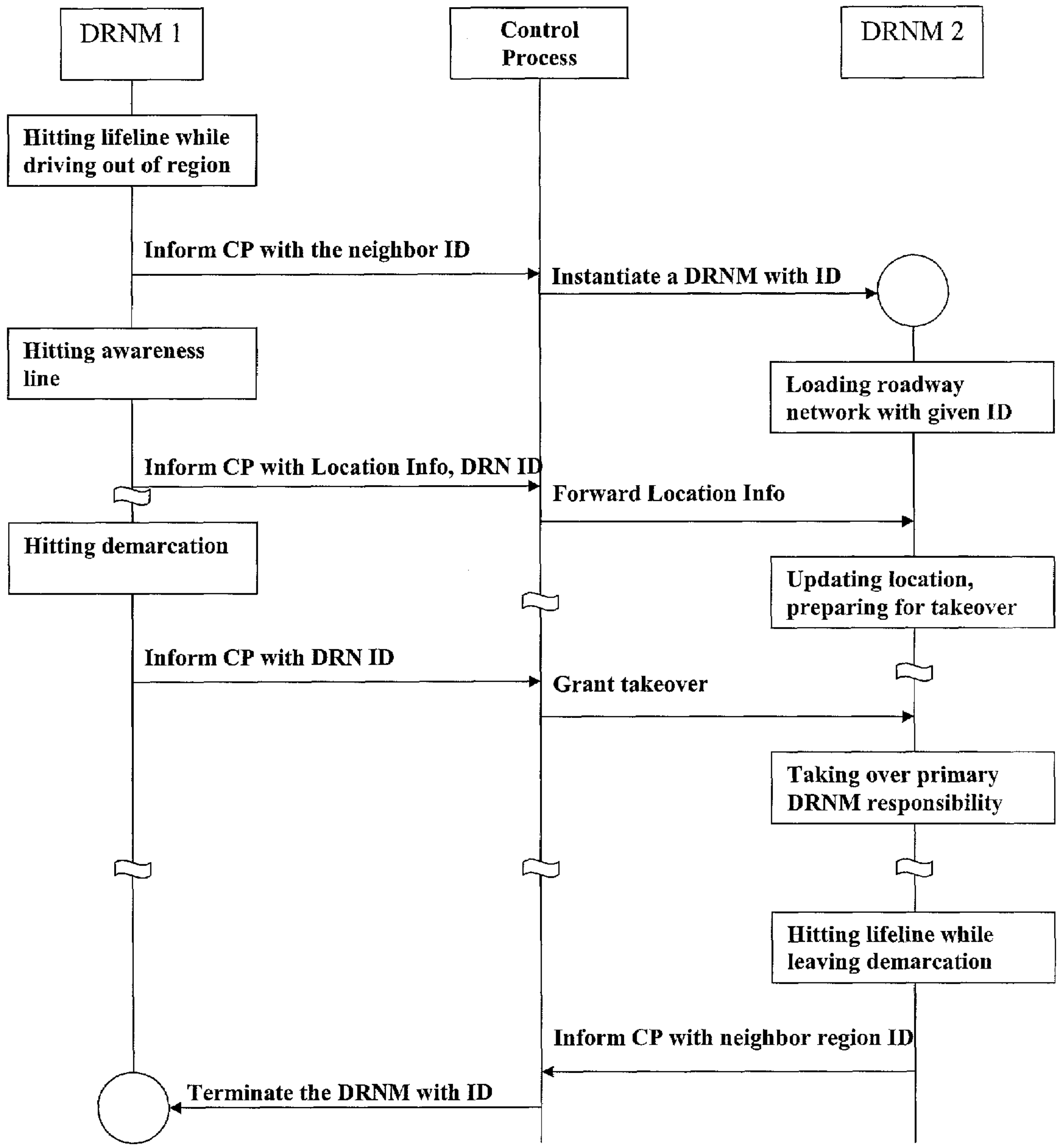
FIG. 4 is a sequence diagram illustrating, by way of example, sequential actions carried out by a Control Process (CP) executing on a microprocessor of an onboard vehicle navigation device in relation to an instantiated pair of interacting traffic managers ("Digitized Road Network (DRN) Managers) that were instantiated by the vehicle support subsystem (VSS) to manage traffic data for Region 1 and Region 2.

FIG. 4 is a sequence diagram illustrating, by way of example, sequential actions carried out by the Control Process (CP) and the DRN managers (traffic manager processes) as a vehicle traveling in Region 1 hits the ITT, traverses the JAZ, and then crosses the demarcation line to enter Region 2. Also explained are the subsequent actions that occur in the Control Process and traffic managers as the vehicle, heading outbound from the demarcation line, departs the JAZ and crosses the ITT threshold of Region 2.

The example depicted with reference to FIG. 4 assumes that a vehicle is driving from Region 1 towards Region 2. When the vehicle hits the lifeline 112, a DRN manager (traffic manager process) needs to be instantiated for Region 2. When the vehicle then hits the awareness line 114 and enters the joint awareness zone 120, the position of the vehicle needs to be passed to the DRN Manager (traffic manager) responsible for traffic in Region 2. When the vehicle reaches the demarcation line 116, the DRN Manager handling traffic for Region 2 will take over the primary role of reading GPS data and reporting the location of the car, thus putting the Region 1 traffic manager into standby mode. Until the vehicle departs the JAZ on the other side of the demarcation line, vehicle position data will be shared with the manager of Region 1 even if it has just been put into standby mode because of the possibility that the vehicle may return to Region 1. In other words, the vehicle may have temporarily veered into Region 2 on its way back into Region 1, thereby requiring the Region 1 manager to maintain full position awareness. When the vehicle exits the JAZ of Region 2, then reporting/sharing of vehicle position data to the manager of Region 1 ceases. When the vehicle reaches the lifeline of Region 2, the DRN Manager of Region 1 is terminated by the control process. At this point, the manager of Region 1 is no longer required for the immediate navigation needs of the vehicle. In other words, traffic conditions prevailing in Region 1 (and its associated subnetwork) are no longer deemed relevant to the vehicle. Of course, if the vehicle turns back and crosses the ITT 112 of Region 2, the manager of Region 1 will be re-instantiated.

It is obvious for those skilled in the art that as the technology develops the basic idea of the invention can be implemented in various ways. The invention and the embodiments thereof are thus not restricted to the examples described above, but they may vary within the scope of the claims.

The invention claimed is:

1. A method of collecting real-time traffic data using moving vehicles and providing the real-time traffic data to an occupant of a vehicle traveling on a continental roadway network, the method comprising steps of:

partitioning a digitized continental roadway network having a plurality of nodes and links that define a digitized representation of the continental roadway network into a plurality of digitized roadway subnetworks; and instantiating one or more traffic managers in an onboard vehicle navigation device for each one of a subset of digitized roadway subnetworks that lie in a vicinity of a current position of the vehicle to collect traffic and provide relevant real-time traffic data to the occupant of the vehicle wherein the step of partitioning the network comprises a step of defining, as an outer belt running approximately parallel to each demarcation line on each side of each demarcation line, an instantiating/terminating threshold (ITT), the ITT comprising a plurality of lifeline nodes each having a list of neighboring regions for instantiating traffic managers for subnetworks corresponding to neighboring regions that become relevant and for terminating traffic managers for subnetworks of regions that become no longer relevant.

2. The method as claimed in claim 1 further comprising steps of:

detecting that the vehicle has arrived at one of the lifeline nodes;

determining whether the vehicle is traveling toward or away from a demarcation line;

if the vehicle is traveling toward the demarcation, instantiating a new traffic manager for the subnetwork which the vehicle is approaching; and if the vehicle is traveling away from the demarcation, terminating the traffic manager for the subnetwork from which the vehicle has departed.

3. The method as claimed in claim 1 wherein the step of partitioning comprises steps of:

defining a joint awareness zone as an inner buffer immediately on each side of each demarcation line that partitions one subnetwork from a neighboring subnetwork, the joint awareness zone having a plurality of awareness nodes forming an awareness line approximately parallel to the respective demarcation line; and defining an instantiating/terminating threshold (ITT) as an outer buffer immediately on each side of the joint awareness zone, the instantiating/terminating threshold having a plurality of lifeline nodes arranged approximately parallel to both the awareness line and the demarcation line.

4. The method as claimed in claim 3 further comprising steps of:

instantiating a traffic manager for each of one or more neighboring subnetworks when the vehicle arrives at a lifeline node;

sharing vehicle position information with a traffic manager responsible for each of the one or more neighboring subnetworks when the vehicle arrives at an awareness node; and terminating a traffic manager corresponding to the subnetwork from which the vehicle has exited when the vehicle, traveling away from the demarcation line, arrives at a lifeline node on the opposite side of the instantiating/terminating threshold.

5. An intelligent vehicle highway system for collecting an providing real-time traffic data from and to vehicles traveling on roadways that are gate of a continental roadway network, the system comprising:

a plurality of vehicles each having an onboard vehicle navigation device having a global positioning system (GPS) receiver for generating real-time position data for the vehicle, a wireless transceiver for transmitting the real-time position data and for receiving traffic data, the onboard vehicle navigation device having a processor that executes an application for instantiating one or more traffic managers for each of the digitized roadway subnetworks defined by partitioning a digitized continental roadway network representative of the roadways of a continent to form a partitioned continental roadway network; and a traffic data center having a wireless transceiver for receiving real-time position data from the plurality of vehicles in the network and for transmitting to the vehicles processed traffic data based on the real-time position data received from the plurality of vehicles in the network wherein the partitioned continental roadway network comprises a plurality of demarcation lines, each demarcation line comprising artificially defined demarcation nodes, the demarcation lines being drawn to partition the network into subnetworks such that no line segment of any demarcation line coincides with any link of the network, and wherein the partitioned continental roadway network comprises an instantiating/terminating threshold (ITT) on each side of the demarcation line, the instantiating/terminating threshold having a plurality of lifeline nodes arranged approximately parallel to the demarcation line whereby arrival of the vehicle at one of the lifeline nodes causes instantiation of a new traffic manager or termination of an existing traffic manager.

6. The system as claimed in claim 5 wherein the partitioned continental roadway network comprises:

a joint awareness zone defining an inner buffer immediately on each side of each demarcation line that partitions one subnetwork from a neighboring subnetwork, the joint awareness zone having a plurality of awareness nodes forming an awareness line approximately parallel to the respective demarcation line whereby vehicle position data for a vehicle located within the joint awareness zone is shared between the traffic managers associated with the neighboring subnetworks on either side of the demarcation line; and an instantiating/terminating threshold (ITT) as an outer buffer immediately on each side of the joint awareness zone, the instantiating/terminating threshold having a plurality of lifeline nodes arranged approximately parallel to both the awareness line and the demarcation line whereby arrival of the vehicle at one of the lifeline nodes causes instantiation of a new traffic manager or termination of an existing traffic manager.

7. An onboard vehicle navigation device for collecting, transmitting and receiving real-time traffic data and for providing intelligent navigation to an occupant of a vehicle traveling on a continental roadway network, the device comprising:

a global positioning system (GPS) receiver for generating a current position of the vehicle;

a wireless transceiver for transmitting the current position of the vehicle to a traffic data center for generating traffic data to be communicated back to the wireless transceiver;

a processor that executes an application for instantiating traffic managers for each one of a plurality of partitioned subnetworks relevant to the current position of the vehicle, the partitioned subnetworks being defined by partitioning a digitized continental roadway network that represents the continental roadway network in terms of nodes interconnected by links to thus form a partitioned continental roadway network; and a user interface for presenting the traffic data to the occupant of the vehicle to enable intelligent navigation through the roadway network wherein the partitioned subnetworks are divided by demarcation lines, each demarcation line comprising demarcation nodes, the demarcation lines being drawn to partition the continental network into subnetworks such that no line segment of any demarcation line coincides with any link of any of the subnetworks and wherein the partitioned continental roadway network comprises:

a joint awareness zone defining an inner buffer immediately on each side of each demarcation line that partitions one subnetwork from a neighboring subnetwork, the joint awareness zone having a plurality of awareness nodes forming an awareness line approximately parallel to the respective demarcation line whereby vehicle position data for a vehicle located within the joint awareness zone is shared between the traffic managers associated with the neighboring subnetworks on either side of the demarcation line; and an instantiating/terminating threshold (ITT) as an outer buffer immediately on each side of the joint awareness zone, the instantiating/terminating threshold having a plurality of lifeline nodes arranged approximately parallel to both the awareness line and the demarcation line whereby arrival of the vehicle at one of the lifeline nodes causes instantiation of a new traffic manager or termination of an existing traffic manager.

* * * * *